United States Patent
Sajid et al.

(10) Patent No.: US 10,071,916 B2
(45) Date of Patent: Sep. 11, 2018

(54) BOTTLE CAP WITH INTEGRATED FREQUENCY TRANSMITTER

(71) Applicant: Three Sevens LLC, Los Angeles, CA (US)

(72) Inventors: Salman Sajid, Los Angeles, CA (US); Gualberto Lozano, Los Angeles, CA (US)

(73) Assignee: Three Sevens LLC

( * ) Notice: Subject to any disclaimer, the term of this patent is extended or adjusted under 35 U.S.C. 154(b) by 176 days.

(21) Appl. No.: 14/884,728

(22) Filed: Oct. 15, 2015

(65) Prior Publication Data

US 2017/0107120 A1    Apr. 20, 2017

(51) Int. Cl.
*B65D 51/24* (2006.01)
*C02F 1/00* (2006.01)
*C02F 1/30* (2006.01)
*B65D 41/34* (2006.01)

(52) U.S. Cl.
CPC .......... *C02F 1/005* (2013.01); *B65D 41/3428* (2013.01); *B65D 51/24* (2013.01); *C02F 1/30* (2013.01); *C02F 1/302* (2013.01); *B65D 2203/10* (2013.01)

(58) Field of Classification Search
CPC . C02F 1/005; C02F 1/30; C02F 1/302; B65D 41/3428; B65D 51/24; B65D 2203/10
USPC ................. 215/228; 340/546.6, 572.8, 309.7
See application file for complete search history.

(56) References Cited

U.S. PATENT DOCUMENTS

| | | | |
|---|---|---|---|
| 2005/0051624 A1* | 3/2005 | Kipp ...................... | B65D 51/24 235/385 |
| 2009/0134098 A1* | 5/2009 | Eng .......................... | A61K 8/19 424/600 |
| 2010/0108673 A1* | 5/2010 | Kurosawa .......... | B65D 41/3428 220/212 |
| 2011/0079571 A1* | 4/2011 | Puccini ............. | B65D 39/0058 215/228 |
| 2015/0307245 A1* | 10/2015 | Puccini ................. | G01K 1/024 215/228 |

* cited by examiner

*Primary Examiner* — James N Smalley

(57) ABSTRACT

A bottle cap having an integrated circuit wherein a frequency can be transmitted to structure water. When the bottle cap is twisted open, a current is created in the circuit strip and the RF chip transmits a predetermined frequency. Particular predetermined frequencies are known to affect the structure of water contained in the bottle, specifically to a healthy hexagonal structure.

2 Claims, 2 Drawing Sheets

BOTTLE CAP WITH INTEGRATED FREQUENCY TRANSMITTER

BACKGROUND OF THE INVENTION

The present invention generally relates to a bottle cap with an integrated frequency transmitter, more particularly to a bottle cap for bottled water, in which the frequency transmitted by the transmitter corresponds to a particular desired frequency.

There are many who know for a fact through extensive scientific research in the benefits of structured water. Structured water or structure-altered water ("SAW") is water that has been subjected to waves of a particular frequency that are known to alter the "structure" of the water. For example, a frequency of 528 MHz and other frequencies listed herein are known through scientific experiments to change the structure of water into a healthier structure, providing a number of physical and emotional benefits for the wellbeing of a person.

The present invention provides various means to transmit a particular frequency to water. In one example, the means provided in a bottle cap. However, the means to transmit a particular frequency to structure water can be provided in other materials, and not limited to a bottle cap.

SUMMARY OF THE INVENTION

The system and method in accordance with the present invention provides a means to deliver a particular frequency to structured water.

The structure of water can constantly change, depending on its surrounding environment. The system in accordance with the present invention, when applied to a non-disposable disposable container, for example, can maintain healthy structure of the water inside the container by emitting particular frequencies. These frequencies can be emitted by one of a number of devices (e.g., RF emitter) powered by one of a number of sources (e.g., battery (solar powered, rechargeable or other), standard power outlet, or kinetic energy). In the case of a disposable container, such as a water bottle with a twist-off cap, kinetic energy from the twisting motion of the cap by the user provides kinetic energy, which is then transformed to power the frequency emitter. Once the structure of the water is changed into a healthy structure, the system will allow maintenance of the healthy structure during its time in the container.

BRIEF DESCRIPTION OF THE DRAWINGS

A more complete understanding of the present invention may be obtained with reference to the Detailed Description when taken in conjunction with the accompanying Drawings.

DETAILED DESCRIPTION OF THE INVENTION

Figure 1:
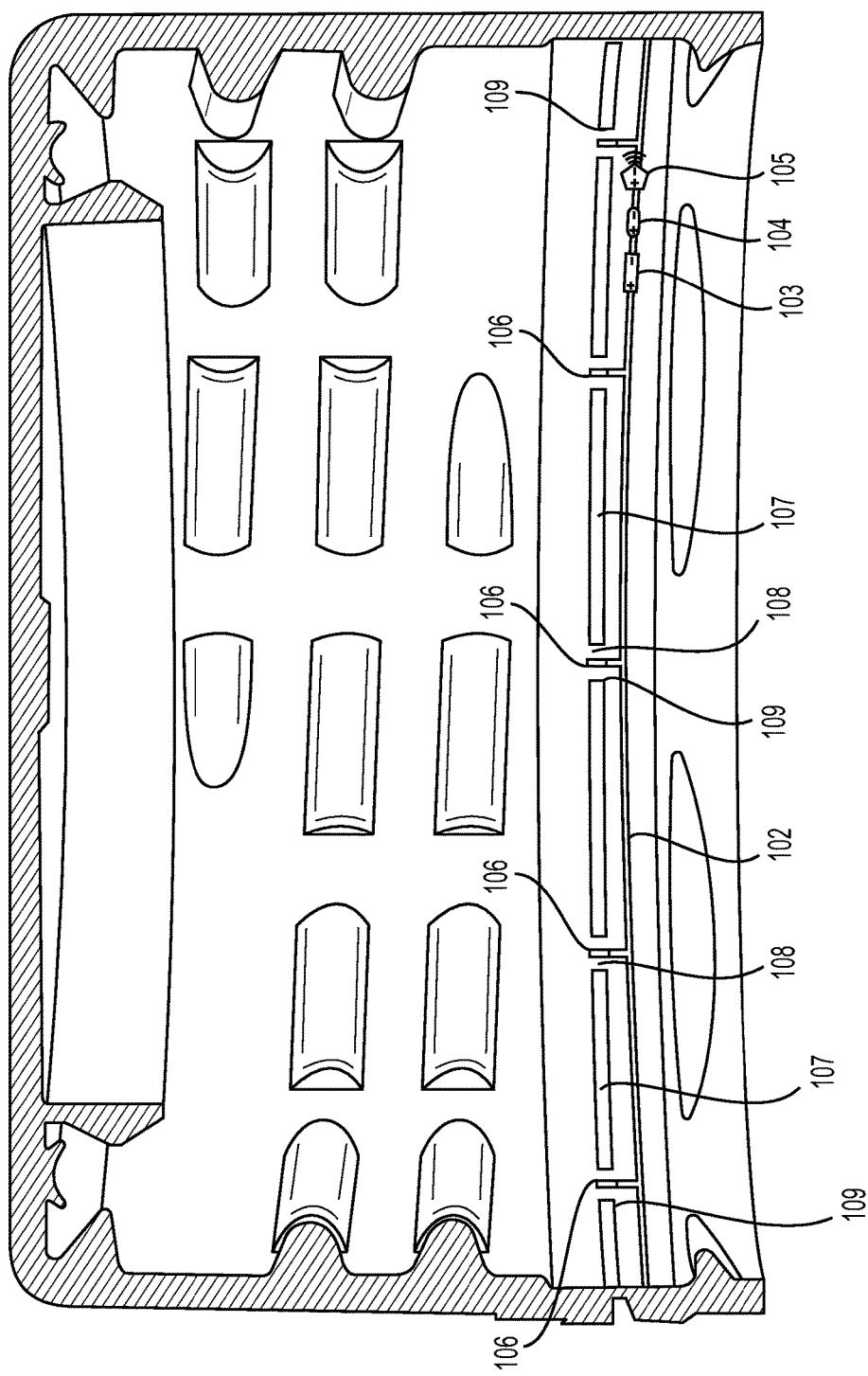
FIG. 1. is a cross-sectional view of a bottle cap in accordance with one aspect of the present invention.

Referring now to FIG. 1, a cross-sectional view of an exemplary bottle cap in accordance with one aspect of the present invention is shown. Bottle cap 101 has a circuit strip 102 placed along the circumference of bottle cap 101. Circuit strip 102 has at least one capacitor 103, at least one resistor 104, and at least one RF chip 105. Extending from circuit strip 102 are strips of barium titanate 106.

Extending on the inside of the circumference of bottle cap 101 are spaced protrusions 107. As such, in between each protrusion 107 is a space 108 created there between creating a plurality of bottle cap breaking points 109. As the bottle cap 101 is twisted off, bottle cap breaking points 109 activate the barium titanate to create a current through circuit strip 102. As current flows though the circuit strip 102, RF chip 105 transmits a specified frequency to structure the water in the water bottle.

In other words, kinetic energy used to open the bottle is generally transferred to the barium titanate, which has piezoelectric properties. The mechanical stress on or kinetic energy applied to the cap is converted to electrical current via the barium titanate. Power is stored and distributed by the capacitor, while the resistor regulates the flow of the current. The RF chip then uses the energy to transmit the desired frequency to the water in the bottle.

Figure 2:
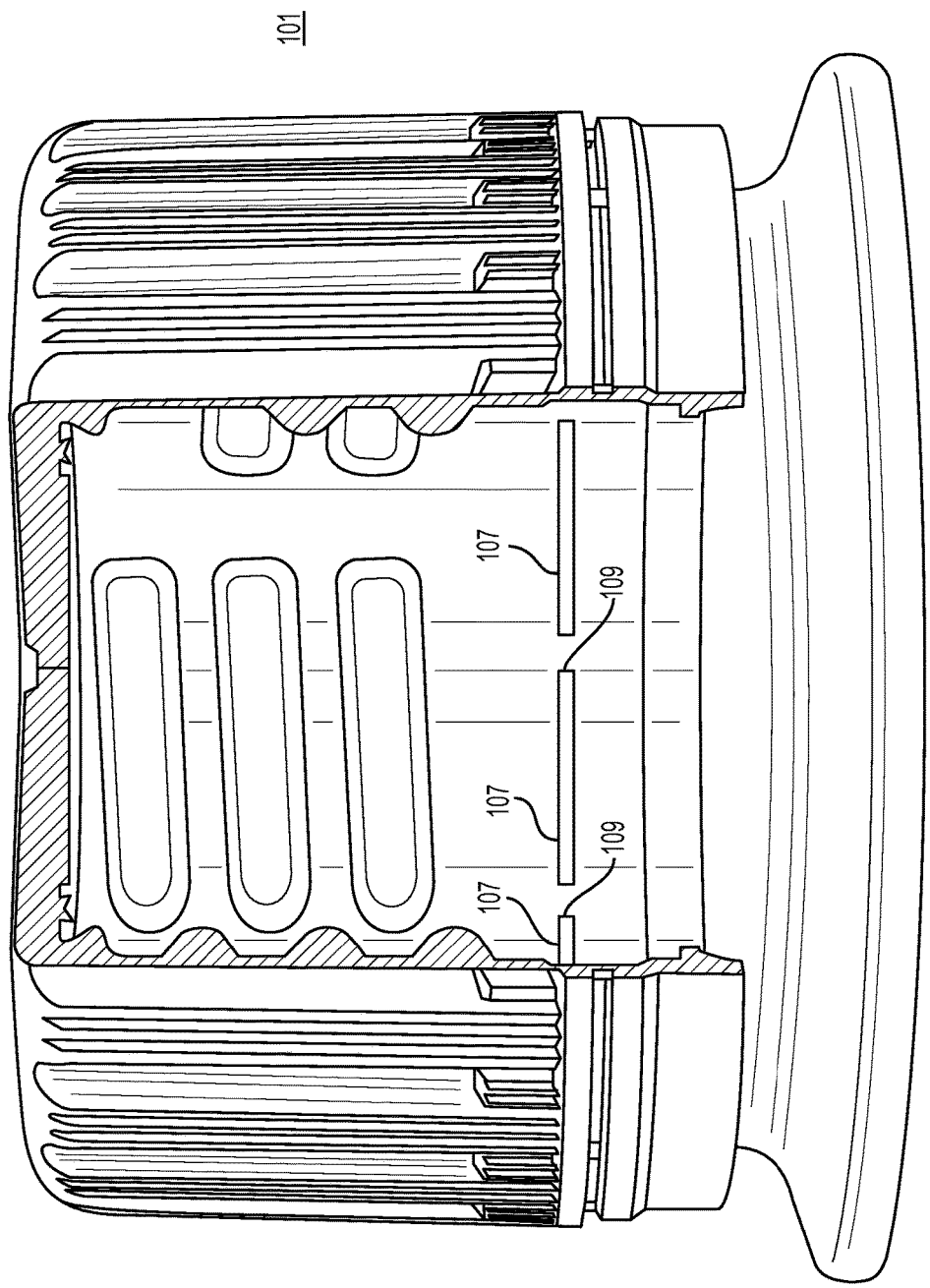
FIG. 2 is a cut-away view showing the inside of a bottle cap without the circuit.

FIG. 2 shows a cut-away view showing the inside of a bottle cap without the circuit. Bottle cap 101 here shows the protrusions 107 and breaking points 109 formed along an inside circumference of the bottle cap 101 to activate the barium titanate (not shown in this figure).

As shown by way of example, certain frequencies are known to change the structure of the water to a healthy hexagonal structure, and believed to do the following as well (frequencies provided are in hertz (Hz)):

174: believed to be a natural anesthetic, reduce physical and emotional pain

285: believed to return tissue to its original form; influence energy field that sends a message to restructure damaged organs 396: believed to turn grief into joy, liberate guilt and fear 417: believed to undo situations and facilitate change, cleanses traumatic experiences, clear destructive influences of past events 528: believed to be the "Love Frequency," whereby the structure of water is turned into a hexagonal structure; believed to transform matter and enable miracles; repair DNA; increased energy, clarity of mind, awareness, awaken of activated creativity, ecstatic states (inner peace), dance and celebration 639: believed to reconnect and balance relationships 741: believed to solve problems 852: believed to awaken intuition; return matter to spiritual order 963: believed to awaken any system to its original perfect state While the exemplary embodiment obtains its energy from a barium titanate along a circuit strip, other piezoelectric materials and/or power sources could be used. For example, a wall plug in, solar, other types of kinetic energy, battery (rechargeable or standard) could also be used.

While the foregoing written description of the invention enables one of ordinary skill in the art to make and use the invention, those of ordinary skill in the art will understand and appreciate the existence of variations, combination, and equivalents of the embodiments, methods, and examples provided herein. The invention should, therefore, not be limited by the embodiments and examples disclosed here, but by all embodiments and methods within the scope and spirit of the invention as claimed.

The invention claimed is:

1. A bottle cap having a circumference comprising:
a circuit strip along the circumference of the bottle cap;

said circuit strip having at least one capacitor, one resistor and one RF chip;
at least one barium titanate strip placed along said circuit strip; and
at least one bottle cap break point surrounding the at least one barium titanate strip;
wherein when the bottle cap is twisted, a current is created in said circuit strip, causing said RF chip to emit a specified frequency.

2. A bottle cap having a circumference comprising:
a circuit strip along the circumference of the bottle cap; and
said circuit strip having at least one capacitor, one resistor and one RF chip;
wherein when the bottle cap is twisted, a current is created in said circuit strip, causing said RF chip to emit a specified frequency.

\* \* \* \* \*